US010360241B2

(12) United States Patent
Tamura

(10) Patent No.: US 10,360,241 B2
(45) Date of Patent: Jul. 23, 2019

(54) DATA MANAGEMENT SYSTEM, CONTROL METHOD, AND STORAGE MEDIUM

(71) Applicant: CANON KABUSHIKI KAISHA, Tokyo (JP)

(72) Inventor: Yu Tamura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 222 days.

(21) Appl. No.: 15/612,952

(22) Filed: Jun. 2, 2017

(65) Prior Publication Data
US 2017/0357709 A1 Dec. 14, 2017

(30) Foreign Application Priority Data
Jun. 9, 2016 (JP) .................. 2016-115517

(51) Int. Cl.
G06F 7/04 (2006.01)
G06F 16/28 (2019.01)
G06F 7/08 (2006.01)
G06F 21/62 (2013.01)
G06Q 10/10 (2012.01)
G06F 17/30 (2006.01)

(52) U.S. Cl.
CPC .............. *G06F 16/283* (2019.01); *G06F 7/08* (2013.01); *G06F 21/6218* (2013.01); *G06F 21/6254* (2013.01); *G06Q 10/10* (2013.01)

(58) Field of Classification Search
CPC ...... G06F 21/6218; G06F 7/08; G06F 16/283; G06F 17/30592; G06F 21/6254; G06Q 10/10
USPC ............... 382/224; 345/204; 725/32; 726/28
See application file for complete search history.

(56) References Cited

U.S. PATENT DOCUMENTS

| 2006/0274358 A1* | 12/2006 | Fukui | G06F 9/44505 358/1.15 |
| 2011/0107367 A1* | 5/2011 | Georgis | H04N 21/2347 725/32 |
| 2013/0076705 A1* | 3/2013 | Murata | G06F 16/54 345/204 |
| 2013/0148155 A1* | 6/2013 | Kitagata | G06F 3/1294 358/1.15 |
| 2014/0010464 A1* | 1/2014 | Umeda | G06K 9/6267 382/224 |
| 2014/0090087 A1* | 3/2014 | Ichijo | G08G 1/205 726/28 |
| 2016/0231887 A1* | 8/2016 | Hatano | H04N 1/00344 |

FOREIGN PATENT DOCUMENTS

JP 2004-145483 A 5/2004

\* cited by examiner

*Primary Examiner* — Gary S Gracia
(74) *Attorney, Agent, or Firm* — Canon U.S.A., Inc. IP Division

(57) ABSTRACT

When a request for analysis target data is received from a web server, a classification designated by the request is identified, and whether the web server is permitted to access the analysis target data that corresponds to the identified classification is checked.

20 Claims, 8 Drawing Sheets

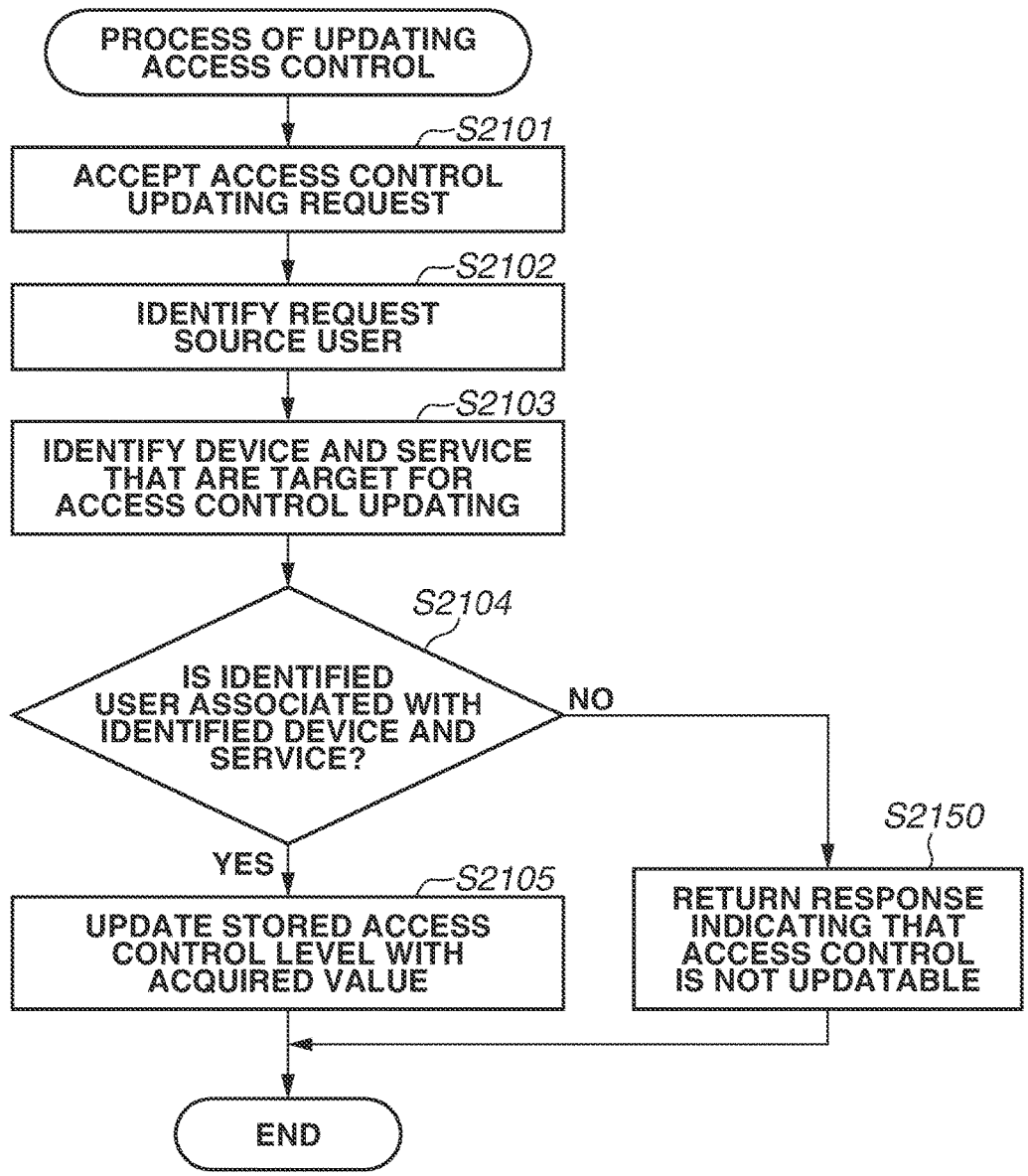

DATA MANAGEMENT SYSTEM, CONTROL METHOD, AND STORAGE MEDIUM

BACKGROUND OF THE INVENTION

Field of the Invention

The aspect of the embodiments relates to a data management system that is configured for careful handling of personal data and are suitable for use in big data analysis, control methods, and a storage medium.

Description of the Related Art

A data warehouse is a conventional repository for big data. The data warehouse classifies, organizes, and manages data on the basis of data schemata. The data stored on the basis of the schemata are used in big data analysis, etc.

Meanwhile, there are cases in which analysis target data includes personal data associated directly with an individual user. According to opt-in rules, a service that handles the analysis target data is supposed to access only data for which prior permission to access is given among the user's personal data. Japanese Patent Application Laid-Open No. 2004-145483 discusses a technique for controlling access to user attributes designated in advance.

As the cloud has become popular, there are more opportunities to analyze various types of data. As the number of data types increases, the number of data schemata also increases, and it becomes difficult to manage data in the data warehouses based on data schemata. For example, there can be a case in which data have no common attribute, such as a case in which while data includes a user identifier (ID) and a document name and the number of pages to be printed, other data includes "add aaa@example.com to the address book".

As a solution, the idea of data lake is developed. In the data lake, data is registered in its native format without limiting the schema of the data. Further, the registered data is managed without being classified and organized, and when the data is retrieved for analysis, etc., it is retrieved in a necessary format. In this way, flexible data storage and analysis is realized.

SUMMARY OF THE INVENTION

According to an aspect of the embodiments, a data management system includes a reception unit configured to receive analysis target data from a plurality of devices, a classification unit configured to classify the analysis target data into at least one of a plurality of classifications, a first storage unit configured to store analysis target data including personal data, a second storage unit configured to store analysis target data which is processed such that personal data included in the analysis target data is made unidentifiable, and a response unit configured to identify, when a request for analysis target data is received from a web server, a classification designated by the request, to check whether the web server is permitted to access the analysis target data that corresponds to the identified classification, and in a case where the web server is confirmed as being permitted, to transmit as a response the analysis target data that corresponds to the identified classification and is stored in the first storage unit or the second storage unit.

Further features of the disclosure will become apparent from the following description of exemplary embodiments with reference to the attached drawings.

BRIEF DESCRIPTION OF THE DRAWINGS

FIG. 8 is a diagram illustrating a process of updating access control according to an exemplary embodiment of the disclosure.

DESCRIPTION OF THE EMBODIMENTS

A data lake is an idea that suits the Internet of Things (IoT) age in which data of various schemata are collected and analyzed. It is expected that as the data lake increases its capability to store various types of data that are analysis target candidates, a plurality of services that accesses analysis target data will analyze the data stored in the data lake for different purposes.

The data can include personal data that is associated directly with an individual user. According to opt-in rules, the services are supposed to access only data for which prior permission to access is given among the user's personal data. Thus, if the data lake accepts registration of personal data, a service without prior permission can no longer refer to the data stored in the data lake.

However, while some services are given permission from the user, some other services are not given permission from the user, so a service that is not supposed to refer to the personal data can refer to the personal data. The aspect of the embodiments is directed to a technique for controlling a service that is not supposed to refer to personal data such that the service is prevented from referring to the personal data.

Various exemplary embodiments of the disclosure will be described below with reference to the drawings. The term "personal data" refers to information that is sufficient to identify a specific individual person. Further, even if data alone is not sufficient to identify a specific individual person, the data is considered as personal data if analysis of the data in combination with other data can identify a specific individual person. For example, an identifier of a mobile terminal has a strong connection with an individual user of the mobile terminal, so the identifier is considered as personal data. Further, a history of positional information is also considered as personal data because a specific individual person can be identified from the history in combination with other data.

Figure 1:
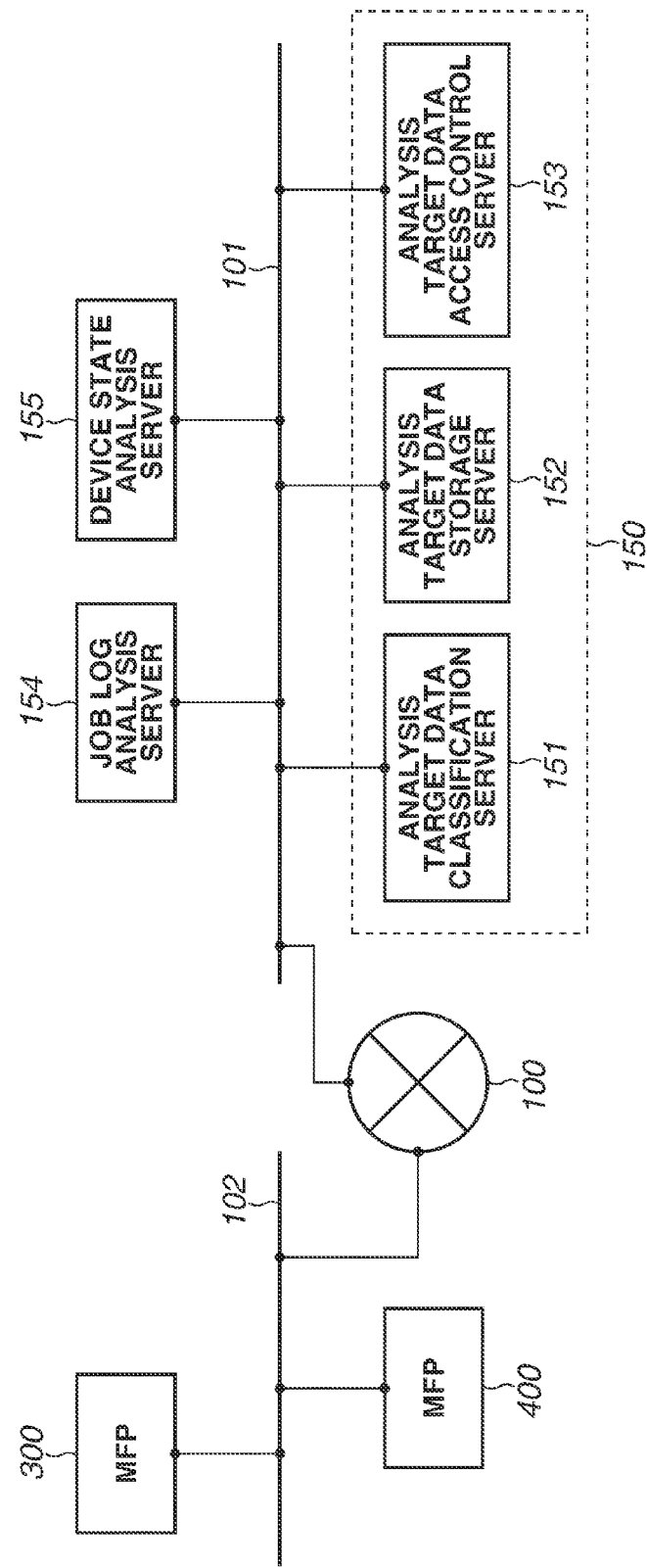
FIG. 1 is a diagram illustrating a network configuration.

A data management system according to an exemplary embodiment of the disclosure is realized on a network having a configuration illustrated in FIG. 1. On a wide area network (WAN) 100, a world wide web (WWW) system is configured in the present exemplary embodiment. Local area networks (LANs) 101 and 102 each connect components.

An analysis target data classification server 151 receives and classifies analysis target data. An analysis target data storage server 152 stores the analysis target data. An analysis target data access control server 153 controls access to the analysis target data. A data management system 150 includes the analysis target data classification server 151, the analysis target data storage server 152, and the analysis target data access control server 153. A job log analysis server 154 analyzes a job log in the stored data. A device state analysis server 155 analyzes a device state in the stored data. A job log analysis service is provided on the job log analysis server 154, and a device state analysis service is provided on the device state analysis server 155. Multi-function peripherals (MFPs) 300 and 400 are connected to the LAN 102 and each performs printing. The analysis target data classification server 151 receives data generated in the MFP 300 or 400 and stores the received data for analysis in the analysis target data storage server 152. A device that transmits the analysis target data to the analysis target data classification server 151 is not limited to the MFPs 300 and 400. A server that analyzes the data stored in the analysis target data storage server 152 is not limited to the job log analysis server 154 and the device state analysis server 155 and can be a web server that provides a web service.

The analysis target data classification server 151, the analysis target data storage server 152, and the analysis target data access control server 153 are connected to each other via the LAN 101. Similarly, the job log analysis server 154 and the device state analysis server 155 are connected to each other via the LAN 101. Similarly, the MFPs 300 and 400 are connected to each other via the LAN 102. The LANs 101 and 102 are connected to each other via the WAN 100. The analysis target data classification server 151, the analysis target data storage server 152, the analysis target data access control server 153, the job log analysis server 154, and the device state analysis server 155 can be configured on different LANs, on the same LAN, on the same personal computer (PC), or on the same server computer. For example, the analysis target data classification server 151, the analysis target data storage server 152, and the analysis target data access control server 153 included in the data management system 150 can be configured on the same server. Further, one or more of the plurality of servers included in the data management system 150, such as the analysis target data classification server 151, can be located on the LAN 102 on which the MFPs 300 and 400 are located.

Figure 2:
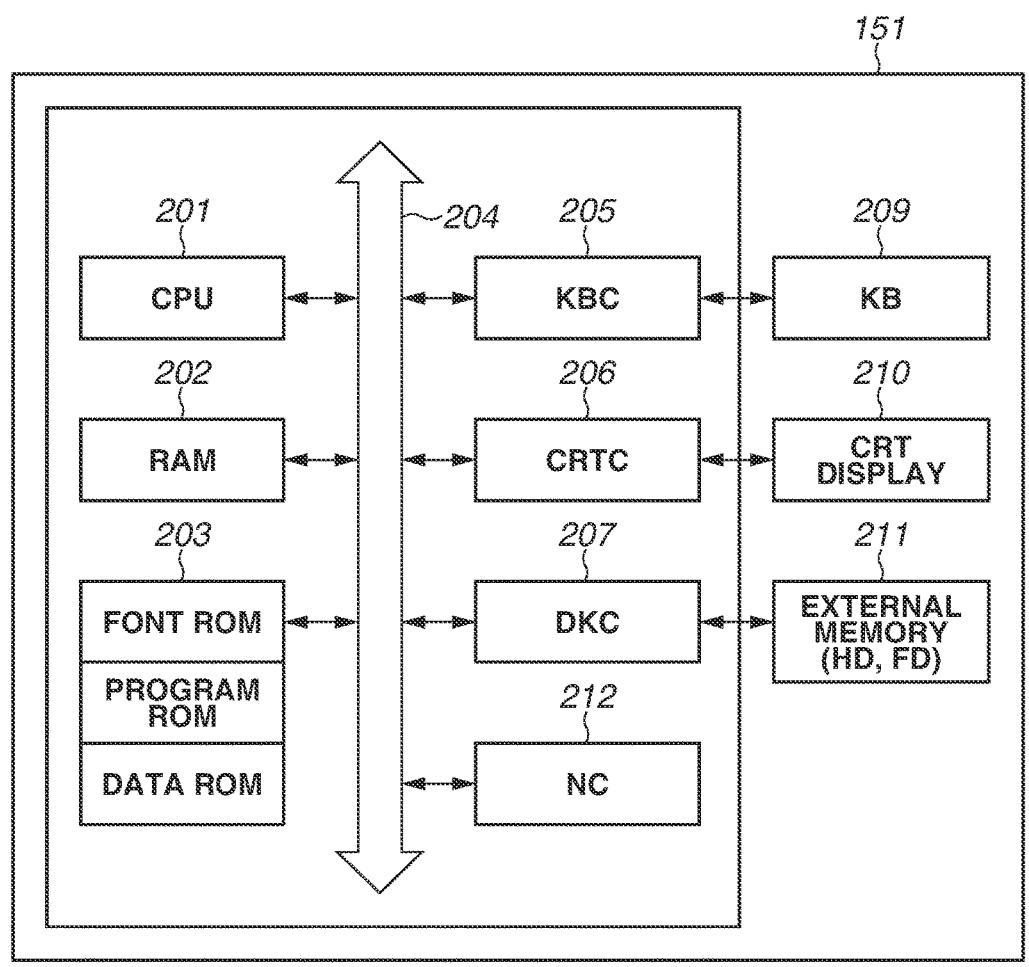
FIG. 2 is a diagram illustrating a configuration of a server computer according to an exemplary embodiment of the disclosure.

The data management system according to the present exemplary embodiment is realized on a system including a PC having a configuration illustrated in FIG. 2. FIG. 2 illustrates a configuration of a server computer of the analysis target data classification server 151 according to the present exemplary embodiment. Server computers of the analysis target data storage server 152, the analysis target data access control server 153, the job log analysis server 154, and the device state analysis server 155 have a similar configuration to that illustrated in FIG. 2. A hardware block diagram illustrated in FIG. 2 corresponds to a hardware block diagram of a general information processing apparatus, and a hardware configuration of the general information processing apparatus is applicable to the server computers according to the present exemplary embodiment.

In FIG. 2, a central processing unit (CPU) 201 executes a program, such as an operating system (OS) and application, stored in a program read-only memory (ROM) of a ROM 203 or a program loaded from a hard disk (HD) 211 to a random access memory (RAM) 202. The OS is an abbreviation for "operating system" which runs on a computer. Hereinafter, the operating system will be referred to as "OS". A process illustrated in a flow chart described below is realized by executing the program. The RAM 202 functions as a main memory of the CPU 201, a work memory, etc. A keyboard controller (KBC) 205 controls key input from a keyboard (KB) 209 and a pointing device (not illustrated). A cathode ray tube (CRT) controller (CRTC) 206 controls displays on a CRT display 210. A disk controller (DKC) 207 controls data access to the HD 211, a floppy (registered trademark) disk (FD), etc. storing various data. A network controller (NC) 212 is connected to the network and executes communication control processing to control communication with other devices connected to the network.

Hereinafter, unless otherwise stated, hardware that executes processing is the CPU 201, and software that executes processing is an application program installed in the HD 211.

Figure 3:
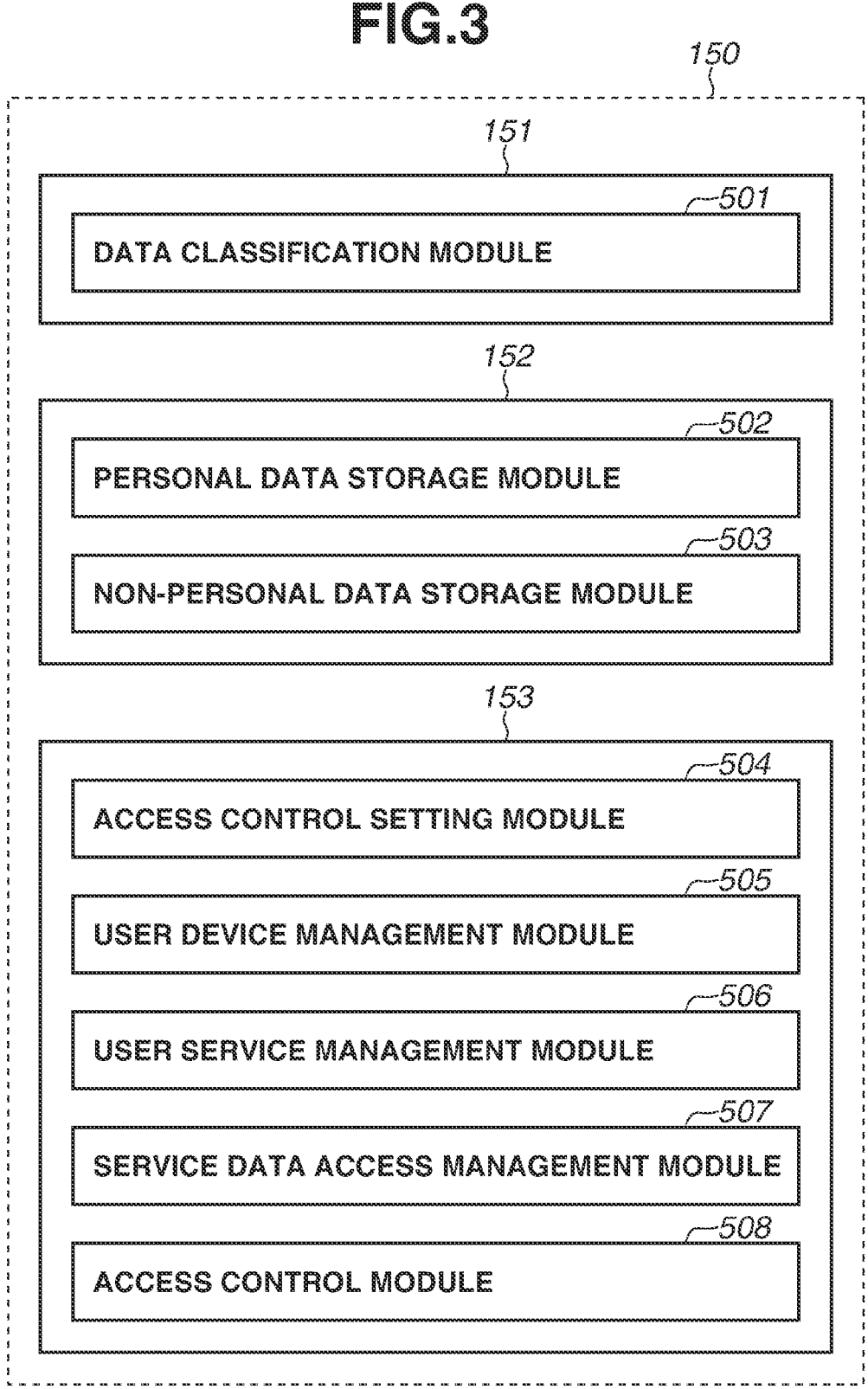
FIG. 3 is a diagram illustrating a module configuration according to an exemplary embodiment of the disclosure.

FIG. 3 illustrates a module configuration of the analysis target data classification server 151, the analysis target data storage server 152, and the analysis target data access control server 153 included in the data management system 150 which manages the analysis target data according to the present exemplary embodiment. Modules included in the module configuration are loaded from the HD 211 into the RAM 202 and executed by the CPU 201 to realize their functions. The analysis target data classification server 151 includes a data classification module 501. The analysis target data storage server 152 includes a personal data storage module 502 and a non-personal data storage module 503. The analysis target data access control server 153 includes an access control setting module 504, a user device management module 505, a user service management module 506, a service data access management module 507, and an access control module 508.

The data classification module 501 classifies data received from the MFP 300 or 400. If the received data includes personal data, the data classification module 501 stores the data in the personal data storage module 502. If the received data does not include personal data, the data classification module 501 stores the data in the non-personal data storage module 503. Specifically, the analysis target data is stored in the storage module that corresponds to the identified classification. The user device management module 505 manages associations between users and devices, and the user service management module 506 manages associations between users and services. The access control setting module 504 refers to the user device management module 505 and the user service management module 506. If a user associated with a device and a service permits the service to access data generated in the device, an association between the service and the device is generated. The generated association between the service and the device is managed by the service data access management module 507, and if a service that accesses the analysis target data attempts to access the data in the device, the access control module 508 determines whether the service is permitted to access the data.

Figure 4:
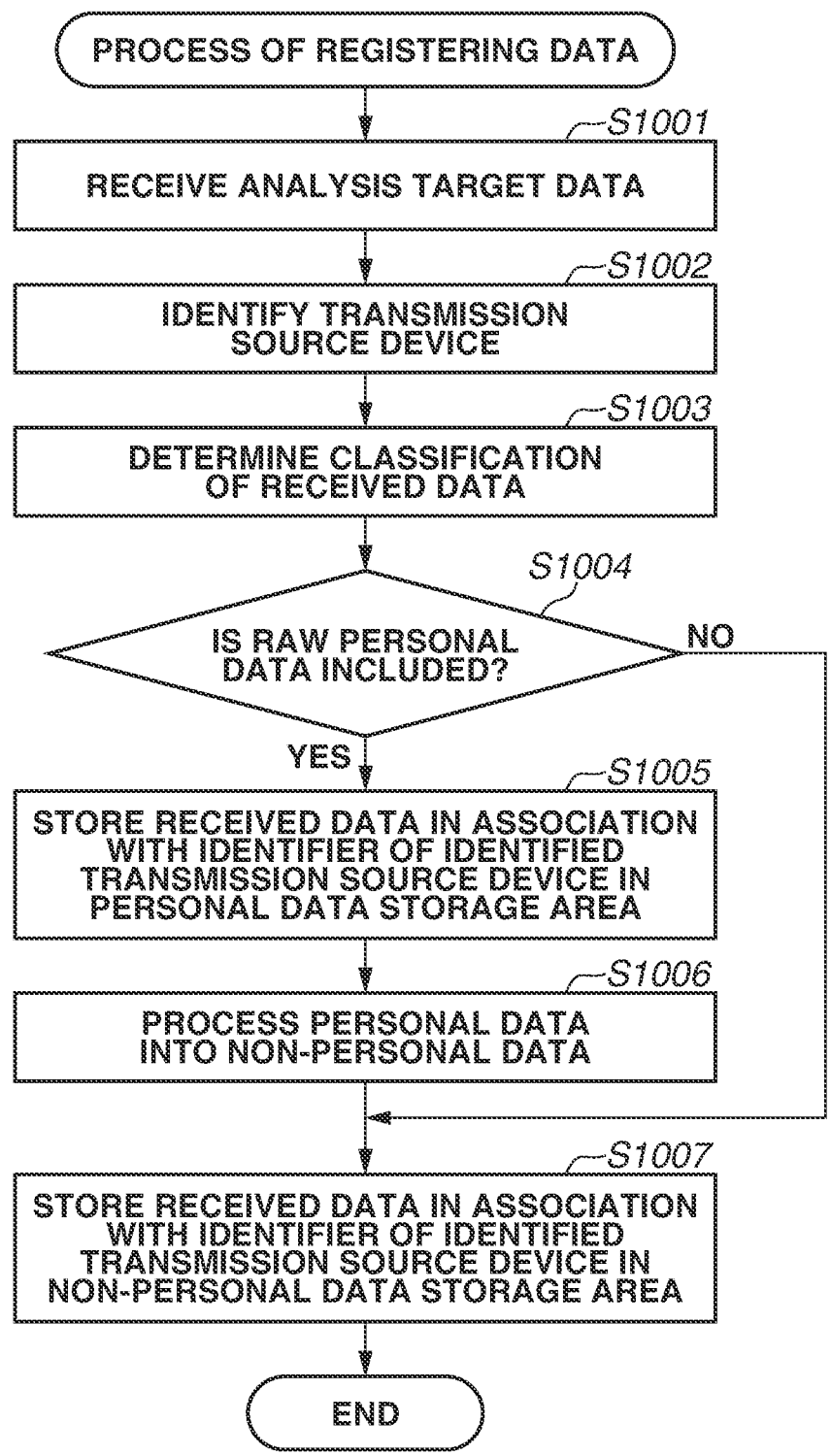
FIG. 4 is a flowchart illustrating a process of registering analysis target data according to an exemplary embodiment of the disclosure.

FIG. 4 is a flow chart illustrating a process of registering data generated in the device, such as the MFPs, in the data management system according to the present exemplary embodiment. The process illustrated in the flow chart is started when data transmitted from a device, such as the MFP 300 or 400, is received by the data classification module 501.

In step S1001, the data classification module 501 receives analysis target data transmitted from the device, such as the MFP 300 or 400. The received analysis target data includes information for identifying the device that is a transmission source of the data. In step S1002, the data classification module 501 identifies the device that is the transmission source of the analysis target data received in step S1001.

In step S1003, the data classification module 501 determines a classification of the analysis target data received in step S1001. In the present exemplary embodiment, the following examples will be discussed as the analysis target data. A first classification can be a log that remains in a state in which the log is generated in the device, such as the MFP 300 or 400. A second classification can be personal data that is processed from the state in which the personal data is generated in the device, such as the MFP 300 or 400, but still includes data associated with an individual person.

The first data and the second data are considered to be associable with a specific individual person, so in step S1003, the first data and the second data are determined as including raw personal data. A third classification besides the first and second classifications can be anonymous data generated by processing information associated with an individual person using a one-way function, such as a hash function. A fourth classification can be general data that does not include information associated with an individual person, such as general data that specifies the amount of toner remaining in the MFP 300 or 400. The third data and the fourth data are considered to be less associable with a specific individual person, so in step S1003, the third data and the fourth data are determined as not including raw personal data. The determination does not have to be based on the above-described criterion. For example, the anonymous data of the third classification can be determined as personal data. The number of data classifications can be larger or smaller than four. Further, information about data classifications can be provided in advance as reference information for use in classifying the data received in step S1001 from the device that is the transmission source of the data.

In step S1004, the processing branches based on the determination in step S1003. In a case where the data received in step S1001 includes raw personal data according to the determination in step S1003 (YES in step S1004), the processing proceeds to step S1005. On the other hand, in a case where the data received in step S1001 does not include raw personal data according to the determination in step S1003 (NO in step S1004), the processing proceeds to step S1007.

In step S1005, the data classification module 501 passes to the personal data storage module 502 the data determined as including personal data in step S1003 together with information of the device identified in step S1002. Further, the personal data storage module 502 stores the received data in association with an identifier of the device.

The following table shows examples of data stored in the personal data storage module 502. The examples include data indicating that login to a MFP is performed by a User X from MFP-300 at 9:00 on 2016 Apr. 1.

| Device Identifier | Time and Date | Analysis Target Data |
| --- | --- | --- |
| MFP-300 | 2016 Apr. 1 9:00 | User X logs in to MFP |
| MFP-300 | 2016 Apr. 1 9:10 | User X prints 10 pages of document A |
| MFP-400 | 2016 Apr. 1 15:00 | User X logs in to MFP |
| MFP-400 | 2016 Apr. 1 15:05 | User X prints 5 pages of document B |
| MFP-400 | 2016 Apr. 1 16:00 | aaa@example.com is registered in address book |
| MFP-400 | 2016 Apr. 1 16:05 | bbb@example.com is registered in address book |
| MFP-500 | 2016 Apr. 1 8:00 | User Y logs in to MFP |
| MFP-500 | 2016 Apr. 1 8:10 | User Y prints 20 pages of document C |
| . | . | . |
| . | . | . |
| . | . | . |

In step S1006, the data classification module 501 processes the data determined as including personal data in step S1003 to convert the data into data including no personal data. In step S1007, the data classification module 501 passes to the non-personal data storage module 503 the data determined as not including personal data in step S1003 together with information of the device identified in step S1002. Alternatively, the data classification module 501 passes to the non-personal data storage module 503 the data processed into the data including no personal data in step S1006 together with the information of the device identified in step S1002. Further, the non-personal data storage module 503 stores the received data in association with the identifier of the device.

The following table shows examples of data stored in the non-personal data storage module 503. In comparison with the data stored in the personal data storage module 502, user IDs are hashed and obfuscated, and information from which personal data is deleted so that the information is not associated with a user is registered. A method for the processing can be a process other than obfuscation and deletion, and any method with which personal data is processed to be unidentifiable can be used. Further, the non-personal data storage module 503 can store analysis target data transmitted from the device and including no personal data.

| Device Identifier | Time and Date | Analysis Target Data |
| --- | --- | --- |
| MFP-300 | 2016 Apr. 1 9:00 | user (hash value: 1a79) logs in to MFP |
| MFP-300 | 2016 Apr. 1 9:10 | 10 pages are printed |
| MFP-300 | 2016 Apr. 1 10:00 | amount of remaining toner decreases |
| MFP-400 | 2016 Apr. 1 15:00 | user (hash value: 1a79) logs in to MFP |
| MFP-400 | 2016 Apr. 1 15:05 | 5 pages are printed |
| MFP-400 | 2016 Apr. 1 15:10 | out of paper |
| MFP-400 | 2016 Apr. 1 16:00 | one registration in address book |
| MFP-400 | 2016 Apr. 1 16:05 | one registration in address book |
| MFP-500 | 2016 Apr. 1 8:00 | user (hash value: 7bc5) logs in to MFP |
| MFP-500 | 2016 Apr. 1 | 20 pages are printed |

-continued

| Device Identifier | Time and Date | Analysis Target Data |
|---|---|---|
|  | 8:10 |  |
| . | . | . |
| . | . | . |
| . | . | . |

Figure 5:
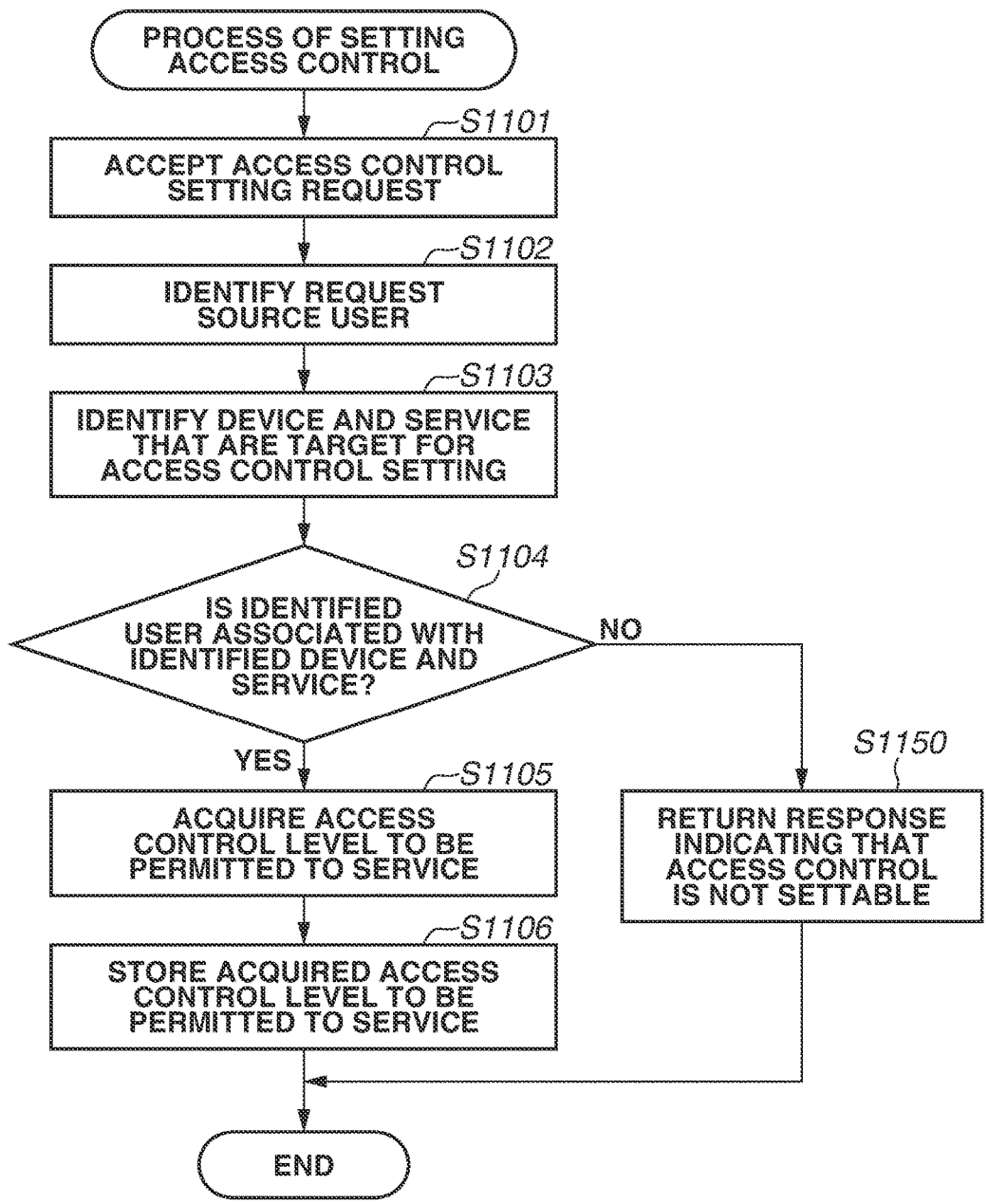
FIG. 5 is a flowchart illustrating a process of access control setting according to an exemplary embodiment of the disclosure.

FIG. 5 is a flow chart illustrating a process of associating a device, such as a MFP, with a service that accesses analysis target data to enable the service to access data generated in the device, such as a MFP, according to the present exemplary embodiment. The process illustrated in the flow chart is started when a user accesses a data access setting screen of the service using a user terminal (not illustrated) and performs a data access setting operation. By performing the process illustrated in the flow chart, the user can permit the service to access the analysis target data.

In step S1101, the access control setting module 504 accepts an access control setting request. The access control setting request includes information for identifying the user who is a source of the request. The access control setting request further includes information for identifying a device and service to which access control is to be set, and information about a classification of data for which permission is to be given.

In step S1102, the access control setting module 504 identifies the user who is the request source of the access control setting request received in step S1101. In step S1103, the access control setting module 504 identifies the device and the service that are specified as targets for the access control setting in the information received in step S1101. In step S1104, the access control setting module 504 checks whether the user identified in step S1102 is associated with the device and the service that are identified in step S1103. In a case where the user is associated with both the device and the service (YES in step S1104), the processing proceeds to step S1105. On the other hand, in a case where the user is not associated with at least one of the device and the service (NO in step S1104), the processing proceeds to step S1150.

A user device management table stored in the user device management module 505 is as follows. The user device management table includes, for example, data indicating that User X is associated with MFP-300. The access control setting module 504 transmits an inquiry to the user device management module 505 to check whether the user is associated with the device. For example, in a case where the user identified in step S1102 is User X and the device identified in step S1103 is MFP-300, it is confirmed that the user is associated with the device.

| User Identifier | Device Identifier |
|---|---|
| User X | MFP-300 |
| User X | MFP-400 |
| User Y | MFP-500 |
| . | . |
| . | . |
| . | . |

A user service management table stored in the user service management module 506 is as follows. The user service management table includes, for example, data indicating that User X is associated with the job log analysis service. The access control setting module 504 transmits an inquiry to the user service management module 506 to check whether the user is associated with the service. For example, in a case where the user identified in step S1102 is User X and the service identified in step S1103 is the job log analysis service, it is confirmed that the user is associated with the service.

| User Identifier | Service |
|---|---|
| User X | job log analysis service |
| User X | device state analysis service |
| User Y | device state analysis service |
| . | . |
| . | . |
| . | . |

In step S1105, the access control setting module 504 acquires an access control level, which is to be permitted to the service, included in the access control setting request received in step S1101.

In step S1106, the access control setting module 504 notifies the service data access management module 507 that the service identified in step S1103 is permitted to access the analysis target data of the device identified in step S1103. The service data access management module 507 associates the service specified in the notification with the device specified in the notification and stores the access control level to be permitted to the service that is acquired in step 1105, and the process is ended.

A device data access level management table stored in the service data access management module 507 is as follows. The device data access level management table specifies that, for example, the job log analysis service can acquire both personal data and non-personal data of MFP-300 but the device state analysis service can acquire only non-personal data of MFP-300. In the device data access level management table, web service identifiers are associated with the device identifiers, and rights to access personal data and non-personal data are also associated.

| Service | Device Identifier | Data Access Level |
|---|---|---|
| job log analysis service | MFP-300 | personal data and non-personal data |
| device state analysis service | MFP-300 | non-personal data |
| device state analysis service | MFP-400 | non-personal data |
| job log analysis service | MFP-500 | personal data and non-personal data |
| . | . | . |
| . | . | . |
| . | . | . |

In step S1150, the access control setting module 504 returns a response indicating that access control is not settable because the user is not associated with at least one of the device and the service, and the process is ended.

Figure 6:
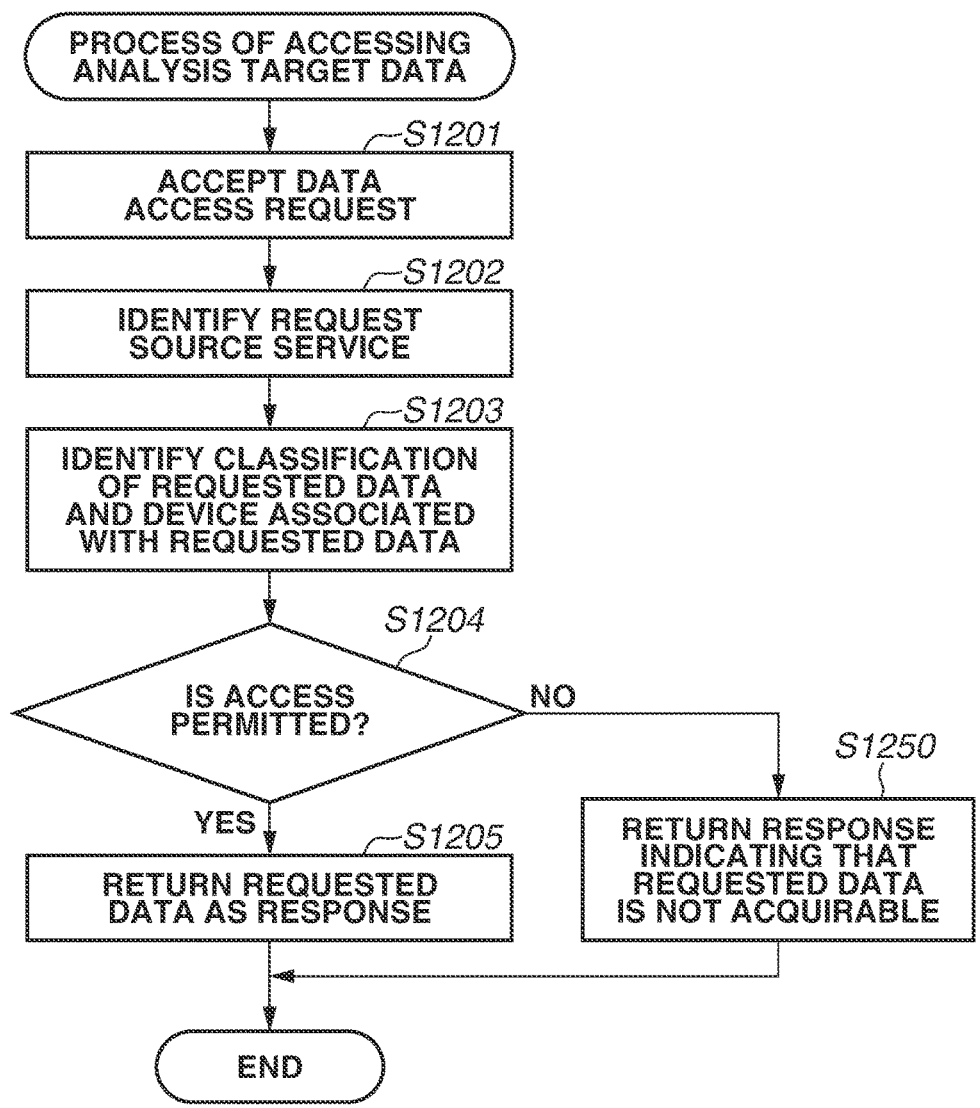
FIG. 6 is a flowchart illustrating a process of accessing analysis target data according to an exemplary embodiment of the disclosure.

FIG. 6 is a flow chart illustrating a process of controlling data access by a service of the job log analysis server 154, the device state analysis server 155, etc. according to the present exemplary embodiment. The process illustrated in the flow chart is started when the analysis target data access control server 153 accepts a data access request from a service, such as the job log analysis service or the device state analysis service.

In step S1201, the access control module 508 accepts a data access request from a service. The data access request includes information for identifying the service that is a source of the request. The data access request further includes information for identifying a device associated with the data for which the access request is made, and information about a classification of the data to be accessed. The data access request can include information for designation other than the designation of the device and the data classification.

In step S1202, the access control module 508 identifies a service that is a request source of the data access request accepted in step S1201. In step S1203, the access control module 508 identifies a classification of the data requested by the data access request accepted in step S1201 and also identifies a device associated with the data.

In step S1204, the access control module 508 transmits an inquiry to the service data access management module 507 to determine whether the service identified in step S1202 can access the data of the classification and the device that are identified in step S1203. For example, if the service is the job log analysis service and the target data classification is personal data and the device is MFP-300, the access control module 508 determines that the data access requested in step S1201 is permitted. On the other hand, for example, if the service is the device state analysis service and the target data classification is personal data and the device is MFP-300, the access control module 508 determines that data access requested in step S1201 is not permitted. In a case where the access control module 508 determines that the data access is permitted (YES in step S1204), the processing proceeds to step S1205. On the other hand, in a case where the access control module 508 determines that the data access is not permitted (NO in step S1204), the processing proceeds to step S1250.

In step S1205, the access control module 508 returns, as a response, the data requested in step S1203, and the process is ended. For example, in a case where the data requested in step S1203 is personal data, the access control module 508 acquires corresponding data from the personal data storage module 502 and returns the acquired data as the response. Further, in a case where the data requested in step S1203 is non-personal data, the access control module 508 acquires corresponding data from the non-personal data storage module 503 and returns the acquired data as the response.

In step S1250, the access control module 508 returns in response to the data access request received in step S1201 a response indicating that the data is not acquirable, and the process is ended.

Figure 7A:
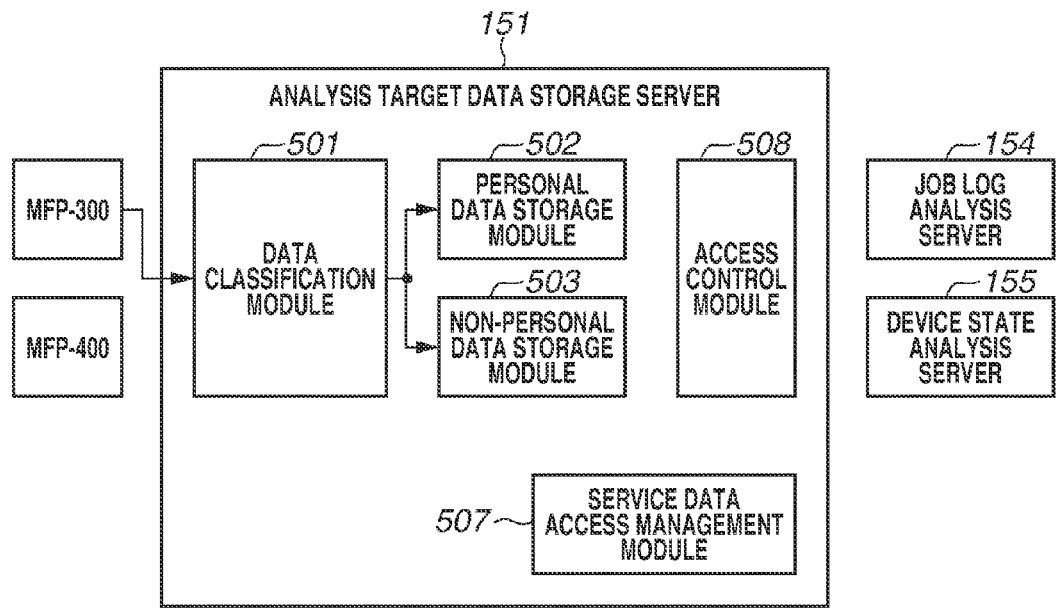
FIGS. 7A and 7B are schematic diagrams illustrating registration of analysis target data and access to the registered data, respectively, according to an exemplary embodiment of the disclosure.
Figure 7B:
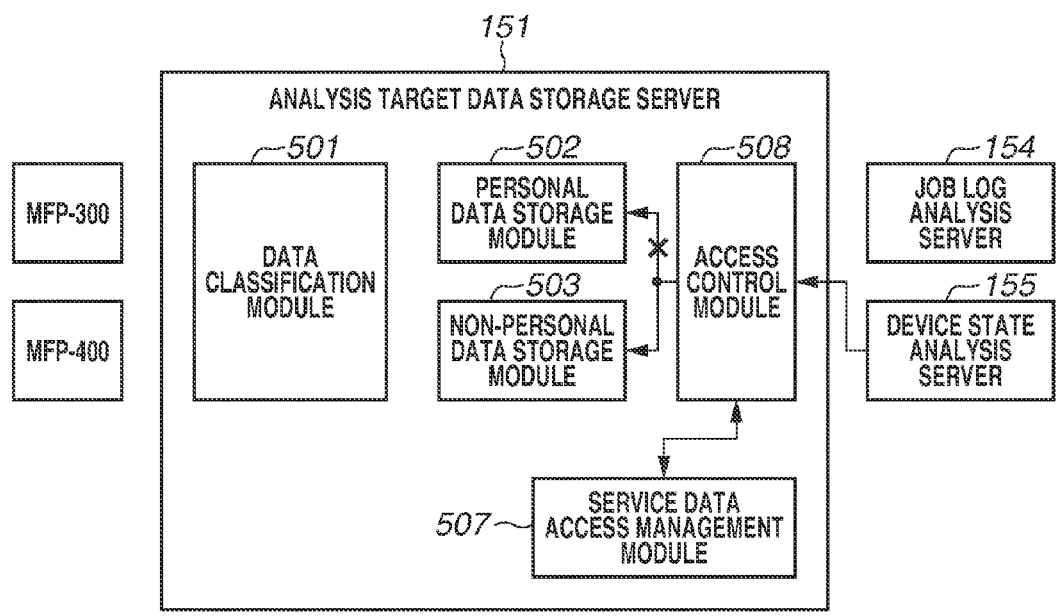

FIGS. 7A and 7B schematically illustrate data registration and data access according to the present exemplary embodiment. In FIG. 7A, the data classification module 501 classifies and processes data received from MFP-300 and then stores the data in the personal data storage module 502 and the non-personal data storage module 503.

In FIG. 7B, the access control module 508 accepts a data access request from the device state analysis service on the device state analysis server 155. The access control module 508 having accepted the data access request transmits an inquiry to the service data access management module 507 to determine data to which the device state analysis service is permitted to access. Consequently, access to the data of MFP-300 that is managed by the non-personal data storage module 503, which is included in the data access request from the device state analysis service, is permitted. On the other hand, access to the data of MFP-300 that is managed by the personal data storage module 502 is denied.

FIG. 8 is a flow chart illustrating a process of updating the access control setting that is set to permit a service to access data generated in a device according to the present exemplary embodiment. The process illustrated in the flow chart is started when a user accesses a data access updating screen of the service using a user terminal (not illustrated) and performs a data access updating operation.

In step S2101, the access control setting module 504 accepts an access control updating request. The access control updating request includes information for identifying the user who is a source of the request. The access control updating request further includes information for identifying a device and a service that are targets for the updating of access control, and information about a classification of data for which new permission is to be given.

In step S2102, the access control setting module 504 identifies the user who is the request source of the access control updating request received in step S2101.

In step S2103, the access control setting module 504 identifies a device and a service that are specified as targets for the access control updating in the information received in step S2101. In step S2104, the access control setting module 504 checks whether the user identified in step S2102 is associated with the device and the service that are identified in step S2103. In a case where the user is associated with both the device and the service (YES in step S2104), the processing proceeds to step S2105. On the other hand, in a case where the user is not associated with at least one of the device and the service (NO in step S2104), the processing proceeds to step S2150.

In step S2105, the access control setting module 504 acquires from the access control updating request received in step S2101 an access control level to be permitted to the service. Further, an access control level stored in the service data access management module 507 is updated with the acquired value, and the process is ended.

In step S2150, the access control setting module 504 returns a response indicating that the access control is not updatable because the user is not associated with at least one of the device and the service, and the process is ended.

According to the present exemplary embodiment, a service that accesses analysis target data can access only the analysis target data to which prior permission from a user is preset. Consequently, even in a case where some services are given permission from the user while some other services are not, a service that is not supposed to refer to personal data is controlled not to refer to the personal data.

Further, according to the present exemplary embodiment, even if a user permits a service to access analysis target data, the access setting can be changed afterward. If the user changes the access setting to cancel the permission to access the analysis target data, the service that accesses the analysis target data can no longer access the analysis target data.

Other Embodiments

Embodiments of the disclosure can also be realized by a computer of a system or apparatus that reads out and executes computer executable instructions recorded on a storage medium (e.g., non-transitory computer-readable storage medium) to perform the functions of one or more of the above-described embodiment(s) of the disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-115517, filed Jun. 9, 2016, which is hereby incorporated by reference herein in its entirety.

What is claimed is:

1. A data management system comprising:
a reception unit configured to receive analysis target data from a plurality of devices, wherein the analysis target data includes information for identifying the plurality of devices;
a classification unit configured to classify the analysis target data into at least one of a plurality of classifications, wherein classifying determines whether data is personal data associated directly with an individual user;
when the analysis target data includes personal data, a first storage device configured to store the portion of analysis target data including the personal data;
a second storage device configured to store the analysis target data which is processed such that personal data included in the analysis target data is made unidentifiable; and
a response unit configured to identify, when a request for analysis target data is received from a web server, a classification designated by the request and a device from the plurality of devices, to check whether the web server is permitted to access the analysis target data that corresponds to the identified classification, and in a case where the web server is confirmed as being permitted, to transmit as a response, the data requested including the analysis target data that corresponds to the identified classification and is stored in the first storage device or the second device,
wherein the reception unit, classification unit, and response unit are executed by a CPU.

2. The data management system according to claim 1, wherein in a case where the response unit confirms that the web server is permitted to access the analysis target data that corresponds to the identified classification, the response unit transmits as the response the analysis target data that is transmitted to the data management system by a device corresponding to a device identifier designated by the request and is stored in the first storage unit or the second storage unit.

3. The data management system according to claim 1, wherein the identifying performed by the response unit to identify the classification designated by the request is to identify whether the classification designated by the request is personal data.

4. The data management system according to claim 1, wherein the response unit determines whether the device identifier designated by the request is associated with the web server, and checks whether the web server is permitted to access the analysis target data that corresponds to the identified classification.

5. The data management system according to claim 4, further comprising:
an acceptance unit configured to accept an access control setting request from a user; and
a determination unit configured to determine whether a device identifier included in the access control setting request and an identifier of the web server are associated with an identifier of the user,
wherein in response to the determination unit determining that the device identifier and the identifier of the web server are associated with the identifier of the user, the response unit associates the device identifier included in the access control setting request with the identifier of the web server, and a personal data access level of the web server is stored in association, wherein the acceptance unit and determination unit are executed by the CPU.

6. The data management system according to claim 1, wherein the second storage unit performs processing to delete the personal data included in the analysis target data or processing to obfuscate the personal data included in the analysis target data, on the analysis target data classified as the data including personal data, and stores the processed analysis target data.

7. The data management system according to claim 1, wherein, among the analysis target data, the first storage unit also stores the analysis target data not including personal data.

8. A method of controlling a data management system, the method comprising:
receiving analysis target data from a plurality of devices, wherein the analysis target data includes information for identifying the plurality of devices;
classifying the analysis target data into at least one of a plurality of classifications, wherein classifying determines whether data is personal data associated directly with an individual user;
when the analysis target data includes personal data, storing, as first storing, the portion of analysis target data including the personal data;
storing, as second storing, the analysis target data which is processed such that personal data included in the analysis target data is made unidentifiable; and
identifying, when a request for analysis target data is received from a web server, a classification designated by the request and a device from the plurality of devices, checking whether the web server is permitted to access the analysis target data that corresponds to the identified classification, and in a case where the web server is confirmed as being permitted, transmitting as a response, the data requested including the analysis target data that corresponds to the identified classification and is stored in the first storing or the second storing.

9. The method according to claim 8, wherein in a case where the web server is confirmed as being permitted to access the analysis target data that corresponds to the identified classification, the analysis target data that is transmitted to the data management system by a device corresponding to a device identifier designated by the request and is stored in the first storing or the second storing is transmitted as the response.

10. The method according to claim 8, wherein the identifying of the classification designated by the request is to identify whether the classification designated by the request is personal data.

11. The method according to claim 8, wherein whether the device identifier designated by the request is associated with the web server is determined, and whether the web server is permitted to access the analysis target data that corresponds to the identified classification is checked.

12. The method according to claim 11, further comprising:
accepting an access control setting request from a user; and
determining whether a device identifier included in the access control setting request and an identifier of the web server are associated with an identifier of the user,
wherein in response to the determination that the device identifier and the identifier of the web server are associated with the identifier of the user, the device identifier included in the access control setting request is associated with the identifier of the web server, and a personal data access level of the web server is stored in association.

13. The method according to claim 8, wherein in the second storing, processing to delete the personal data included in the analysis target data or processing to obfuscate the personal data included in the analysis target data is performed on the analysis target data classified as the data including personal data, and the processed analysis target data is stored.

14. The method according to claim 8, wherein, among the analysis target data, the analysis target data not including personal data is also stored in the first storing.

15. A non-transitory computer-readable storage medium storing a program for controlling a data management system, the program comprising:
receiving analysis target data from a plurality of devices, wherein the analysis target data includes information for identifying the plurality of devices;
classifying the analysis target data into at least one of a plurality of classifications, wherein classifying determines whether data is personal data associated directly with an individual user;
when the analysis target data includes personal data, storing, as first storing, the portion of analysis target data including personal data;
storing, as second storing, the analysis target data which is processed such that personal data included in the analysis target data is made unidentifiable; and
identifying, when a request for analysis target data is received from a web server, a classification designated by the request and a device from the plurality of devices, checking whether the web server is permitted to access the analysis target data that corresponds to the identified classification, and in a case where the web server is confirmed as being permitted, transmitting as a response, the data requested including the analysis target data that corresponds to the identified classification and is stored in the first storing or the second storing.

16. The non-transitory computer-readable storage medium according to claim 15, wherein in a case where the web server is confirmed as being permitted to access the analysis target data that corresponds to the identified classification, the analysis target data that is transmitted to the data management system by a device corresponding to a device identifier designated by the request and is stored in the first storing or the second storing is transmitted as the response.

17. The non-transitory computer-readable storage medium according to claim 15, wherein the identifying of the classification designated by the request is to identify whether the classification designated by the request is personal data.

18. The non-transitory computer-readable storage medium according to claim 15, wherein whether the device identifier designated by the request is associated with the web server is determined, and whether the web server is permitted to access the analysis target data that corresponds to the identified classification is checked.

19. The non-transitory computer-readable storage medium according to claim 15, wherein in the second storing, processing to delete the personal data included in the analysis target data or processing to obfuscate the personal data included in the analysis target data is performed on the analysis target data classified as the data including personal data, and the processed analysis target data is stored.

20. The non-transitory computer-readable storage medium according to claim 15, wherein, among the analysis target data, the analysis target data not including personal data is also stored in the first storing.

* * * * *